G. T. PARR.
TRELLIS.
APPLICATION FILED FEB. 3, 1917. RENEWED FEB. 27, 1920.
1,336,580.
Patented Apr. 13, 1920.
3 SHEETS—SHEET 2.
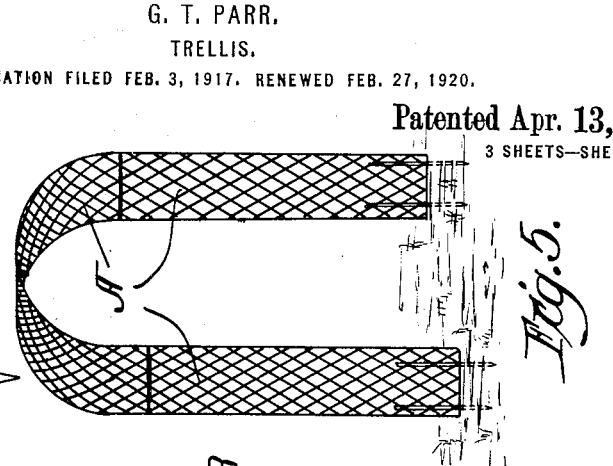
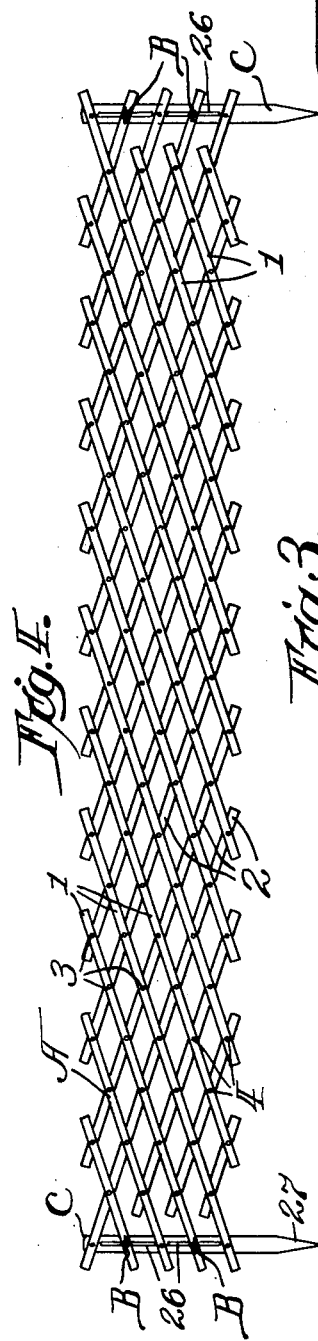
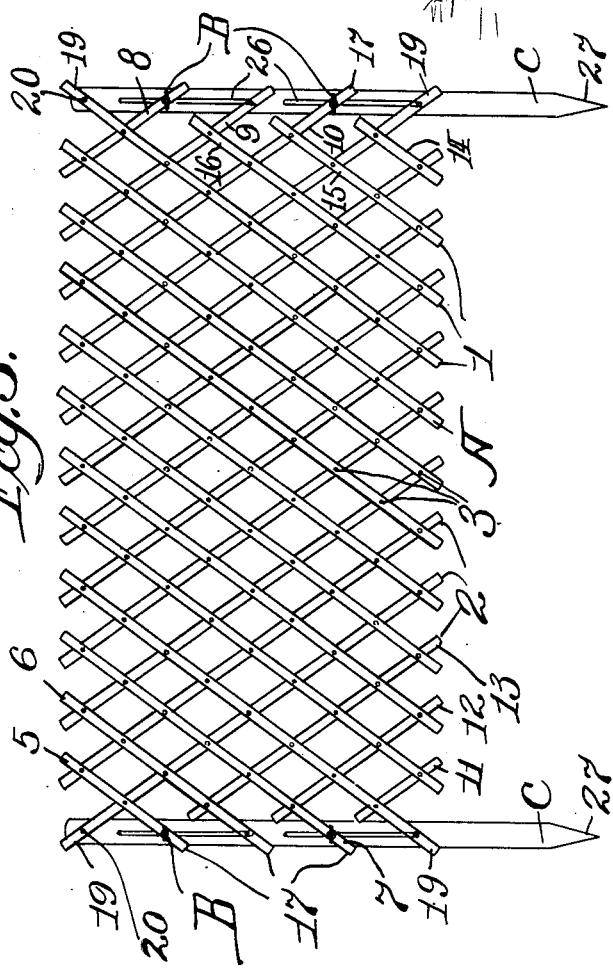
Inventor:
George T. Parr,
Howard Fischer
Attorney.

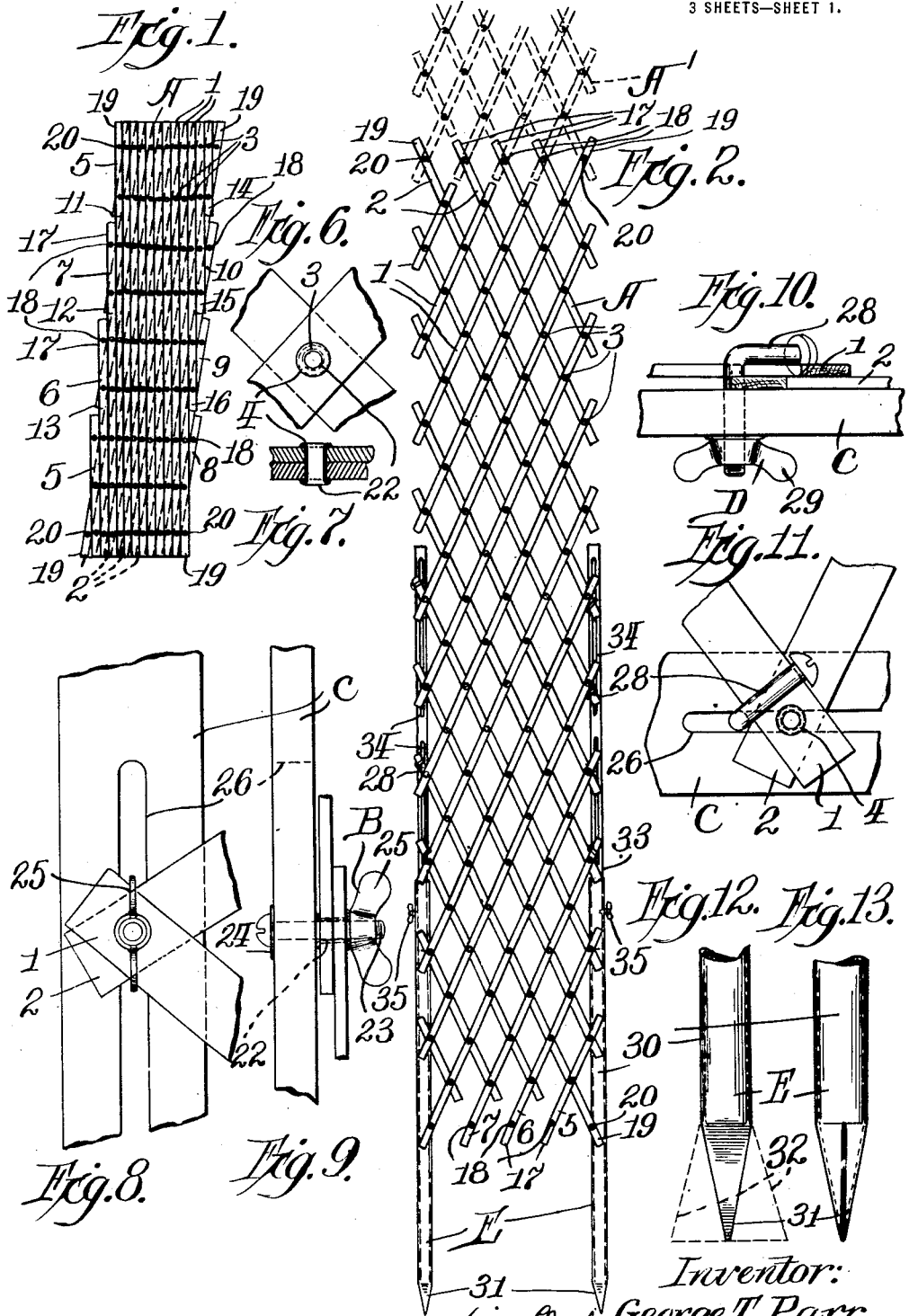

G. T. PARR.
TRELLIS.
APPLICATION FILED FEB. 3, 1917. RENEWED FEB. 27, 1920.
1,336,580.
Patented Apr. 13, 1920.
3 SHEETS—SHEET 3.
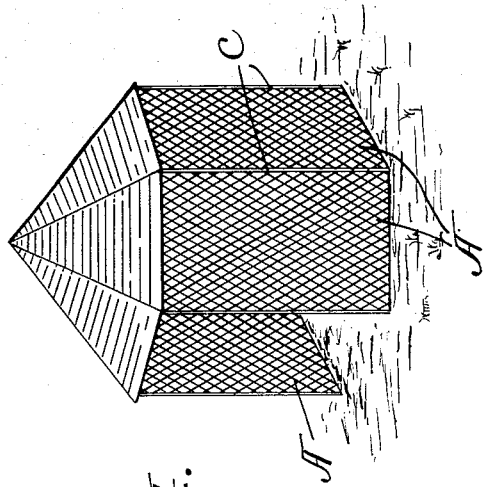
Fig. 14.
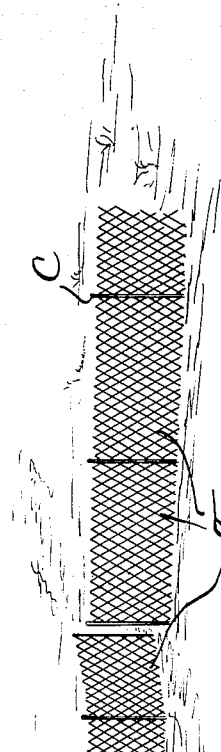
Fig. 15.
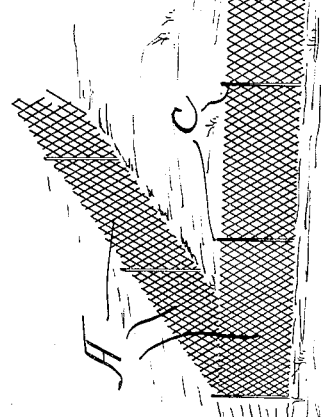
Inventor:
George T. Parr,
By: Attorney.

UNITED STATES PATENT OFFICE.

GEORGE T. PARR, OF ST. PAUL, MINNESOTA.

TRELLIS.

1,336,580.  Specification of Letters Patent.  Patented Apr. 13, 1920.

Application filed February 3, 1917, Serial No. 146,493. Renewed February 27, 1920. Serial No. 361,722.

*To all whom it may concern:*

Be it known that I, GEORGE T. PARR, a citizen of the United States, residing at St. Paul, in the county of Ramsey and State of Minnesota, have invented a new and useful Improvement in Trellises, of which the following is a specification.

This invention relates to garden trellises or flower guards which can be set up any place in the garden or about the home and is adapted to uses for various flowers.

The primary object of this invention being in a collapsible or folding trellis with detachable clamping means.

A further object is a clamping device for holding the trellis rigid when closed or extended, the clamping device forming a stake which can be driven into the ground at any desired place to hold the trellis in rigid position.

It is also an object to have the stake telescoping so that it can be extended to different lengths when desired.

Other objects of this invention is in a trellis which is formed of sections of folding members each section having connecting means on either end, whereby sections can be added to the trellis, to give any length or size trellis that is desired.

It is an object of this invention to have the trellis collapsible into a small space when folded together, being flat and narrow, making it easy to handle. When it is desired to remove the trellis from the garden in the fall of the year, it can be easily taken down collapsed and stored away in a small space.

Further objects are in having flexible bars which can be curved to any suitable shape and having the bars pivoted together by eyelets thereby making a strong and durable construction and also allowing clamping means to be inserted in the eyelets to hold the trellis rigid when opened or closed.

Other features and advantages will be more clearly defined in the following specification and claims.

In the drawing which forms part of this specification:

Figure 1 is a side elevation of the trellis in closed or collapsed position.

Fig. 2 illustrates the trellis in extended vertical position with clamps and stakes on either end.

Fig. 3 illustrates the trellis in extended or opened horizontal position.

Fig. 4 illustrates the trellis in extreme horizontal extended position.

Fig. 5 is a diagrammatic view of the trellis in the form of an arch.

Figs. 6 and 7 are details illustrating the eyelet pivoting of the trellis bars.

Figs. 8 and 9 illustrate details of one form of clamping device.

Figs. 10 and 11 illustrate details of another form of clamping device.

Figs. 12 and 13 illustrate details of stake construction.

Fig. 14 illustrates a diagrammatic view of a house made up of sections of trellis.

Fig. 15 illustrates a diagrammatic view of a fence and guard made out of sections of trellis.

In the drawings A represents a trellis section made up of a series of bars or slats 1 and 2 which are pivoted at the points 3 by means of the eyelets 4 or any other suitable pivoting means.

The bars 1 are on one side and bars 2 on the other side. The bars 1 and 2 are of a substantially flat construction so as to lie face to face when folded into the position illustrated in Fig. 1 to make a compact device.

The cross section of the bars 1 and 2 is substantially rectangular in shape but it is obvious, however, that the bars or slats can be made in any suitable shape so as to have the face of the same which lie adjacent to each other, flat to form a good bearing surface at the pivot points.

The end slats or bars 1 of the trellis A are shortened to form bars 5, 6 and 7 and the bars 2 are shortened to form bars 8, 9 and 10 on the opposite side and end of the trellis. The bars 5 and 8, 6 and 9, 7 and 10 being of similar length and construction. Bars 11, 12 and 13 on the same end as the bars 5, 6 and 7 are of the same construction and length, as bars 14, 15 and 16, which are positioned on the other end of the trellis but on the opposite side to the bars 11, 12 and 13 and on the same end as the bars 8, 9 and 10. The bars 5, 6 and 7 and 8, 9 and 10 are longer respectively than the bars 11, 12 and 13 and the bars 14, 15 and 16.

The free ends 17 of the bars 5, 6, 7, 8, 9 and 10 have holes 18 formed therein which are adapted to perform the same functions as the pivot points 3, the purpose of which will be hereinafter described.

On either end of the trellis, one of the full length bars 1 and 2 has a free end 19 which has an opening 20 therein. The opening 20 in the end 19 of the bars 1 and 2 is adapted to form a pivot point similar to the points 3, the purpose of which will be hereinafter described.

When the trellis A is folded into compact or closed position as illustrated in Fig. 1, the bars 1 are held in substantial vertical position while similar bars 2 on the opposite side are at an angle to the bars 1. By this arrangement and construction, when the trellis is opened into extended position, as illustrated, the slats or bars 1 and 2 form a diamond shaped lattice work which gives a neat and attractive appearance to the trellis. The pivoting of the bars as illustrated gives a toggle lever action and allows the trellis to be extended to a great degree varying the length and width to the desired shape for the desired purpose.

The bars 1 and 2 are of a flexible material so that they can be curved or bent such as is illustrated in the arch in Fig. 5, it also being obvious that the trellis can be used in a circular form.

The eyelet 4 as illustrated in Figs. 6 and 7 is preferred as a pivoting means for the bars 1 and 2 as the edges of the eyelet when clamped in position form ring-like surfaces to take the place of washers which engage the outer surface of the bars 1 and 2 and hold them adjacent to each other but allow them to pivot on the cylindrical surface of the eyelet. The eyelet pivoting also allows an opening 22 through the bars and through which a bolt 23 of the clamping means B may be inserted and by use of the washer 24 under the head of the bolt and wing nut 25 on the other end of the bolt, the trellis may be clamped to the stakes C at any convenient pivot point. Slots 26 in the stake C allow for the sliding of the bolt 23 to the desired position when clamping the trellis to the stake.

The stakes C illustrated in Figs. 3 and 4 are of a flat construction rectangular in cross section having a sharp end 27 which allows the stake to easily pierce the ground and enter therein. In use the stakes C are driven into the ground in the desired position and the trellis A is clamped by its edges thereto, with the clamping means B illustrated in Figs. 8 and 9 or the clamping means D illustrated in Figs. 10 and 11.

The clamping device D illustrated in Figs. 10 and 11, comprises a bolt 28, bent L shaped and adapted to receive a wing nut 29 on the end of the bolt which passes through the slot 26 of the stake C. The other end of the bolt which carries the head of the same is adapted to clamp against the bars 1 and 2 of the trellis to securely hold the same when the wing nut 29 is tight.

The stakes E illustrated in Fig. 2 have the lower end formed of a piece of metal tubing 30 with a sharp portion 31 on the lower end which is formed by flattening the tubing and then cutting off the portion 32 illustrated in dotted outline in Fig. 12. Fig. 13 illustrates a side view of Fig. 12 to show how the tubing is flattened.

Extension portion 33 is adapted to slide in the tubing 30 and is preferably round with slots 34 to receive the clamping means B or D. When the trellis is extended as is illustrated in Fig. 2, the stakes E can be also extended to the desired length and then the portion 33 clamped in position in the tubing 30 by means of the engaging bolt 35 which is of ordinary construction and preferably threaded into the upper portion of the tubing 30 so that when it is tightened, it will clamp the portion 33 in the tube 30.

When it is desired to shorten the stake E, the portion 33 can be slid into the tubing 30, thus the stake E can be made long or short as desired to clamp the trellis and hold it securely in different positions. It is obvious the stakes can be made in other shapes and forms but it is important to have a stake which is extendible so as to be used when the trellis is extended to open the same. The upper portion 33 can also be removed from the tubing 30 and used separately to clamp the trellis if it is desired. By means of the metal tubing 30 which is driven in the ground, the stake E is very much stronger and more durable than an ordinary wooden stake and the portion 33 can be made of wood or any other suitable material.

The bars 1 and 2 of the trellis are preferably made of wood or any other suitable material which does not readily conduct heat or cold as it is much preferred to use a material such as wood for plants or vines to grow on. Tubing 30 also acts as a weather-proofing for stake 33, non-rotting for no ground contact.

When the trellis is opened or extended as is illustrated in Fig. 2, the bars 5, 6, 7, 8, 9 and 10, together with the ends 19 of the bars 1 and 2, extend beyond the body of the trellis and are adapted to receive similar ends of other sections of trellis. A portion of trellis A' is pivotally secured by suitable means to the upper part of the trellis A as illustrated in Fig. 2, in dotted outline. The portion A' is detachably connected to the ends 17 through the holes 18 and the ends 19 through the holes 20, thus section after section could be pivotally connected together to form any desired shape of trellis. Another section of trellis could be connected in a suitable manner to the other end of the trellis A illustrated in Fig. 2.

The diagrammatic views illustrated in Figs. 14 and 15 show that the trellis sections A can be used to build a lattice work house or fence or other suitable garden fixtures which can be changed from time to time to ornamentally decorate the garden or to be put up for permanent structures for vines, etc., to grow on. It is also evident that the trellis could be made to receive sections on the top and bottom of the same in the same manner as sections are attached to the ends, thus giving an unlimited development and use of the size of the trellis.

By the use of this convertible trellis, a very convenient and desirable supporting means is obtained for garden plants and if desired the trellis can be used in extended low-down position as illustrated in Fig. 4 for fences in the garden, the advantage being that it can be moved from place to place very readily at will.

In accordance with the patent statutes, I have described the principles of operation of my invention together with the apparatus which I now consider to represent the best embodiment thereof but I desire to have it understood that the construction is only illustrated and that the invention can be carried out by other means and applied to uses other than those above set forth within the scope of the following claims:

1. In a trellis or flower guard, comprising, a series of bars pivoted together to form a toggle lever action, said bars being adapted to be folded into a compact closed position or extended to form a lattice work, said bars being made up sectionally and having means on either end of each section for pivotally connecting the bars of one section with the bars of another to increase the size of said trellis.

2. In a trellis for flowers, comprising, a series of bars pivoted together to form a collapsible lattice work, said lattice work being formed in sections having projecting ends on either end for engaging with the projecting ends of an adjoining section so as to pivotally and detachably connect the ends of the sections of said trellis together.

3. In a trellis or flower guard, including a detachable clamping stake, a series of bars pivoted together to form a toggle lever action, said bars being adapted to fold into a compact closed position or extended to form a lattice work and means slidably connected to said stake for clamping the ends of said trellis to hold said bars in different positions to said stake, said stake being adapted to be driven into the ground and detachable from said bars so that said trellis can be folded into a compact form independent of said stake.

4. In a collapsible trellis, comprising, a series of bars pivoted together to form a lattice work when extended, said lattice work being formed in sections and having projecting end bars on either end of said trellis whereby similar sections may have their projecting bars directly secured together to form different shapes, substantially as described.

5. A collapsible trellis, including a series of bars pivoted together to form a lattice work when extended, detachable holding stakes and means slidably held to said stakes for rigidly clamping the ends of said trellis to hold said bars in various positions to said stake or release said bars from said stake so that said stake can be separated from said bars for the purposes specified.

GEORGE T. PARR.